I. W. GOODWIN.
SPRING FRAME FOR BICYCLES.
APPLICATION FILED APR. 22, 1913.

1,085,411.

Patented Jan. 27, 1914.

Inventor
Ira W. Goodwin,

Witnesses
By Victor J. Evans
Attorney

UNITED STATES PATENT OFFICE.

IRA W. GOODWIN, OF SANTA BARBARA, CALIFORNIA.

SPRING-FRAME FOR BICYCLES.

1,085,411. Specification of Letters Patent. Patented Jan. 27, 1914.

Application filed April 22, 1913. Serial No. 762,839.

*To all whom it may concern:*

Be it known that I, IRA W. GOODWIN, a citizen of the United States, residing at Santa Barbara, in the county of Santa Barbara and State of California, have invented new and useful Improvements in Spring-Frames for Bicycles, of which the following is a specification.

This invention relates to spring frames for bicycles and similar vehicles, the object in view being to provide a simple, economical and effective spring mounting for the rear driving wheel of the machine, whereby increased comfort is given to the driver and also to the passenger, where one is carried, and at the same time the entire mechanism and frame-work of the machine is relieved, by reason of the fact that the ordinary road shocks are absorbed at the rear of the machine, the shocks on the front wheel being taken care of by the elastic or spring front fork or section of the frame now in use on motorcycles of various kinds.

With the above and other objects in view, the invention consists in the construction, combination and arrangement of parts, as will be hereinafter more fully described, illustrated in the accompanying drawings, and pointed out in the claim hereunto appended.

Figure 1:
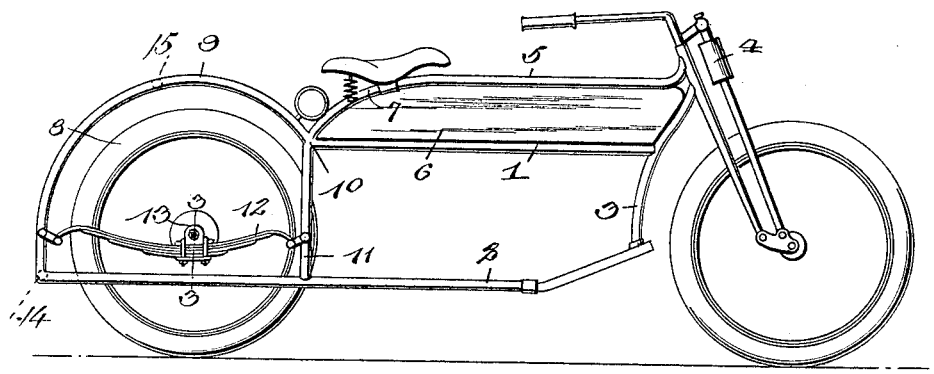
Figure 2:
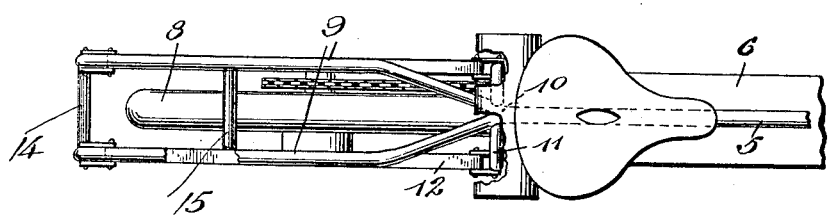
Figure 3:
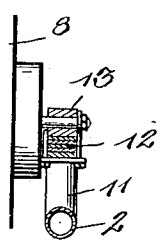

In the drawings: Figure 1 is a side elevation of a motorcycle showing the present invention applied thereto. Fig. 2 is a top plan view of the rear portion of the frame, showing also the rear wheel and springs. Fig. 3 is a vertical cross section on the line 3—3 of Fig. 1.

The frame of the machine contemplated in this invention is of a well-known construction, in so far as it embodies the top run 1 and the bottom run composed of the substantially parallel side bars 2, the said runs being connected rigidly at their forward ends to the forward frame bar or reach 3 which is in turn connected to the head 4 of the machine. 5 designates an additional top run which extends from the head 4 back to the rear end of the run 1. The rear portion of the run 5 curves over the tapered rear end of the oil tank 6, as shown at 7.

In carrying out the present invention, the bottom run side bars 2 are extended rearwardly to a point beyond the rear driving wheel 8, where they have connected to their extreme rear ends the bottom ends of a pair of substantially parallel arcuate frame bars 9 having substantially the curvature of the rim of the wheel and extending from the rear ends of the bars 2 upwardly and forwardly to the rear ends of the runs 1 and 5, to which they are connected at the point 10. From the same point 10, the rear stays or fork members 11 extend downwardly to and connect rigidly with the bars 2, the stays or fork members 11 being approximately vertical, as shown in Fig. 1.

Extending from the bars 9 to the stays 11 and located just above the rear extensions of the parallel bars 2 are leaf springs 12, the rear ends of which are connected with the bars 9, and the forward ends of which are connected with the stays 11 in such manner as to permit the central portions of said springs 12 to yield upwardly and downwardly. The axle of the driving wheel 8 is carried by bearings 13 fastened to the springs 12 at a point about midway between the points of attachment of the extremities of said springs to the bars 9 and 11, the driving wheel 8 being geared to and driven by the engine in a manner well understood by those familiar with the art to which this invention appertains.

From the foregoing description, it will be seen that the driving wheel 8 is mounted so as to yield readily by means of the springs 12, the latter acting to absorb road shocks, and thereby add materially to the comfort of both the driver and the passenger who ordinarily sits directly over the driving wheel, and at the same time increasing the life and durability of the machine, due to the absence of excessive shocks on the rear driving wheel and the corresponding portion of the frame of the machine. The arcuate bars 9 are adapted to support a mud guard (not shown), and also to act as a support for the passenger's seat (also not shown).

What is claimed is:

In a bicycle, a machine frame comprising substantially parallel bottom runs which are extended rearwardly to a point in rear of the driving wheel, stays connecting the top run of the machine to the bottom runs thereof in advance of the axle of the driving wheel, arcuate bars extending from the junction of said stays with the top run over and in rear of the driving wheel and connected at their rear extremities to the corresponding extremities of the bottom runs, a driving wheel, and leaf springs by which the axle of the driving wheel is carried, said springs being connected at their front and rear ends, respectively to said stays and arcuate bars above the plane of the bottom runs.

In testimony whereof I affix my signature in presence of two witnesses.

IRA W. GOODWIN.

Witnesses:
RAY ELLIOTT,
JESSE P. OSBORNE.

Copies of this patent may be obtained for five cents each, by addressing the "Commissioner of Patents, Washington, D. C."